United States Patent

[11] 3,572,721

[72] Inventors Stanley R. Harrison
 Castle Bromwich, near Birmingham;
 Robert M. Broughton, Boldmere, Sutton
 Coldfield, England
[21] Appl. No. 649,869
[22] Filed June 29, 1967
[45] Patented Mar. 30, 1971
[73] Assignee The Dunlop Company Limited
 London County, England
[32] Priority July 22, 1966, Mar. 7, 1967
[33] Great Britain
[31] 32,952/66 and 10734/67

[54] PLAY BALLS
 16 Claims, No Drawings
[52] U.S. Cl. .................................................. 372/218,
 260/4, 260/5, 260/41.5, 260/876, 260/889,
 273/229, 273/230
[51] Int. Cl. ..................................................... A63b 37/00
[50] Field of Search .......................................... 260/4, 5,
 889, 876 (B); 273/218, 229, 230

[56] References Cited
 UNITED STATES PATENTS
 3,421,766  1/1969  Chimiel et al ................ 260/889
 2,910,451  10/1959 Cantwell ...................... 260/889
 2,914,328  11/1959 Harkins ........................ 273/230
 3,313,545  4/1967  Bartsch ........................ 273/218
 3,373,123  3/1968  Brice ............................ 260/2.5
 FOREIGN PATENTS
 217,159    5/1957  Australia ...................... 260/889
 1,026,254  4/1966  Great Britain ................ 273/330

Primary Examiner—John C. Bleutge
Attorney—Stevens, Davis, Miller and Mosher

ABSTRACT: Playballs, particularly golf balls, which are moulded from a composition which includes a blend of rubber with a thermoplastic homopolymer or copolymer of an alpha-olefine. The balls may be single-piece mouldings or mouldings of a one, two or more piece core encased in a cover.

PLAY BALLS

This invention relates to playballs and particularly to playballs for use as golf balls for general playing purposes and for practice on driving ranges.

Golf balls for use in tournaments and competitions are of a high quality with regard to durability, flight and playing characteristics, but such golf balls are expensive. For general playing purposes and for practice, such as on a driving range, it is usual to use a cheaper ball than the tournament balls, but the cheaper balls is required to have durability, flight characteristics and playing characteristics which do not differ greatly from those of a tournament ball. In particular, the practice ball is required to have good resistance to cutting and good flight characteristics such that when struck with a golf club the ball will travel approximately the same distance as a tournament ball would travel. Also, the practice ball should preferably have the same feel when struck as a tournament ball and should preferably result in the same "click" when struck as is given by a tournament ball.

According to the present invention there is provided a play ball comprising a blend of rubber and a thermoplastic, substantially crystalline homopolymer or copolymer of an alpha-olefine, the rubber being present in the blend in an amount of from 5 percent to 95 percent by weight of the blend.

For example, suitable blends include blends of rubber and a thermoplastic, substantially crystalline homopolymer of ethylene or a copolymer obtained by copolymerizing a major amount of ethylene with a minor amount of another olefine, the rubber being present in the blend in an amount of 5 percent to 95 percent by weight of the blend. Other suitable blends include those of rubber and a thermoplastic, substantially crystalline homopolymer of propylene or copolymer obtained by copolymerizing a major amount of propylene with a minor amount of another olefine, the rubber being present in the blend in an amount of 5 percent by 95 percent by weight of the blend.

Preferably, the alpha-olefine homopolymer contains not more than six carbon atoms and may be ethylene, isotactic polypropylene, isotactic polybutene-1 or isotactic poly-4-methyl-pentene-1.

The copolymerizable olefine preferably contains not more than eight carbon atoms and may be butene-1, hexene-1, ethylene or propylene, where these materials are not the primary olefine in the copolymer.

Said copolymer can be a terpolymer containing preferably not more than 10 percent, and especially not more than 5 percent of other unsaturated monomers. A preferred third monomer is butadiene.

Blends of various homopolymers and/or copolymers may be used.

According to the present invention there is also provided a method for the manufacture of a ball suitable for use as a golf ball, comprising forming a composition including a blend of rubber and a thermoplastic, substantially crystalline homopolymer or copolymer of an alpha-olefine, the rubber being present in the blend in an amount of from 5 percent to 95 percent by weight of the blend, adding filler if desired to said composition and moulding the blend obtained to form a ball.

The amount of rubber is usually from 50 to 90 percent by weight and preferably from 60 to 80 percent by weight.

The rubber used may be natural or synthetic and examples of suitable synthetic rubbers are polybutadiene, (especially cis-polybutadiene), copolymers of butadiene with styrene or acrylonitrile, polybutylene, copolymers (elastomeric) of ethylene with propylene or higher alpha-olefines, polyisoprene and polychloroprene. It is to be understood that blends or mixtures of synthetic rubbers, or of natural rubber and one or more synthetic rubbers, may be used. Preferably, the rubber is cis-polybutadiene or a blend or mixture of cis-polybutadiene with natural rubber, and in this latter case the cis-polybutadiene should be present in an amount of at least 50 percent by weight of the blend or mixture. A high molecular weight cis-polybutadiene is preferred, e.g. a polymer having a molecular weight of from $2\times10^5$ to $2\times10^6$.

The blend of the thermoplastic homopolymer or copolymer and the rubber can be prepared by mixing the two components together on a mill or in an internal mixer at an elevated temperature. The temperature can conveniently be from 30° C. to 50° C. higher than the melting point of the thermoplastic component. Fillers, coloring agents and antioxidants, if required, can be added to the blend during this mixing. The blend is the cooled to 115° C. to 125° C. prior to the addition of curing agents if desired, after which the composition can be cooled and chipped or granulated.

The composition is preferably cured and this is preferably effected by the use of organic peroxide curing agents such as dicumyl peroxide, or if desired, curing can be effected by irradiation or by sulfur. Usually, sulfur only results in the cross-linking of only the rubber component and so it is preferred to use a peroxide curing agent which results in cross-linking of both or all of the components of the blend to yield a highly resilient ball which is not deformed under the conditions of impact by a golf club. In the case of crystalline copolymers containing unsaturation, sulfur will result in cross-linking of both or all of the components of the blend.

Usually, the curable composition of the blend will be cured by heating it in the presence of a curing agent at an elevated temperature and suitable temperatures are from 150° C. to 250° C. The composition is also moulded to form the ball at a temperature usually from 150° C. to 350° C. and so moulding and curing are usually effected substantially simultaneously. The composition can be formed into the ball by a variety of moulding techniques, e.g. injection, compression or transfer moulding. When the composition is cured by heating, the time required for curing will usually be short, say 20 to 60 minutes, depending upon the half-life of the peroxide curing agent used.

The amount of filler material is usually from 30 to 70 percent by weight of the polymer and depends on the size and weight of the ball to be produced. Whilst most fillers can be used those with a very high specific gravity are preferred in order to reduce the required loading to a minimum.

A ball of the present invention can be a one-piece moulded ball or a composite ball consisting of two or more portions, for example the ball can comprise a core and cover, the core comprising a blend of rubber and a thermoplastic, substantially crystalline homopolymer or copolymer of an alpha-olefine, the rubber being present in the blend in an amount of from 5 percent to 95 percent by weight of the blend.

The cover can be of the same composition as the core or different. For example, the cover can be of one or more of the following: a blend of the types disclosed in our British Pat. applications Nos. 32,953/66 and 32,954/66, balata; trans-polymers of a conjugated diolefine, for instance trans-polyisoprene, trans-polybutadiene, (preferably having a trans-polymer content of at least 90 percent); cis-polymers of conjugated diolefines; for instance cis-polyisoprene, cis-polybutadiene, preferably having a cis-polymer content of at least 50 percent; natural rubber; polyurethanes; polyamides; copolymers of butadiene and styrene; polymers and copolymers of ethylene; polymers and copolymers of propylene; compositions of our British Pat. applications Nos. 5,693/65 and 38,674/65 or copolymers of unsaturated olefines with esters of unsaturated acids, for instance methyl methacrylate-butadiene copolymers, especially those of high (especially predominating) methyl methacrylate content; neoprene, especially in crystalline form.

The cover can be one or more of the elastomeric materials disclosed in British Specification No. 1,037,091.

The cover composition can contain a filler, for example inorganic fillers such as silica lead carbonate or titanium dioxide, the latter being especially useful in providing a white appearance to the ball.

The term "copolymer" used in this Specification includes polymers obtained from two, three or more reactants (which can be monomers or partially polymerized materials), interpolymers, block polymers, and blends thereof.

The method by which the cover is fixed to the core depends upon the nature of the material used for the cover. Where it is a thermoplastic material it can be applied either by an injection moulding process, for instance one in which molten material is forced around the periphery of the core centrally mounted in a spherical mould, or it can be applied for instance in the form of two hemispherical shells encasing the core and which are moulded to the core and are sealed together along their edges to form a smooth integral spherical shell cover. The latter process can also be used where the material used for the cover is not thermoplastic.

The means by which the cover is fixed to the core depends very much upon the nature of the cover and core. Where the cover is formed by a process of injection moulding around the core there is normally no need for auxiliary means of fixing as the material of the cover will, while still molten, flow into intimate contact with the periphery of the core resulting in a strong bond between the two portions of the ball. However, where the cover is moulded, for example by compression moulding from two hemispherical shells it may be necessary to use auxiliary means of fixing, for example an adhesive. An alternative auxiliary means of fixing is by mechanical interlocking means, for example by forming the core so as to have protruberances or recesses in its surface on to which the cover can lock when moulded onto the core.

A further form of golf ball according to the present invention is one in which the core itself consists of two or more portions. Such a structure is very useful where it is wished to concentrate the weight of the ball on the center, through it can be used in other circumstances. In such a structure the core can consist of a spherical inner portion or inner core (for instance a glass or steel ball) surrounded by two or more outer core portions which together form a spherical shell about it. For example, if there are two outer core portions they can be in the form of hollow hemispherical shells which together surround the inner core to form a composite structure of spherical shape. The material composing the inner core and outer core portions can be the same or different, and one or more of the inner core or outer core portions can comprise the blend of natural or synthetic rubber with a thermoplastic olefine, homopolymer or copolymer as described above.

The dimensions of the components of a composite golf ball according to the present invention may suitably be as follows:

| Ball diameter, inches | 1.62 | 1.68 |
| --- | --- | --- |
| Two component ball: | | |
| Core diameter, inches | 0.75–1.6 | 0.75–1.64 |
| Preferred range, inches | 1.00–1.54 | 1.00–1.60 |
| Cover thickness, inch | 0.020–0.435 | 0.020–0.465 |
| Preferred range | 0.040–0.310 | 0.040–0.340 |
| Particularly preferred range, inch | 0.060–0.125 | 0.060–0.125 |
| Three component ball: | | |
| Inner core diameter, inch | 0.25–1.00 | 0.25–1.00 |
| Overall core diameter, inches | 0.75–1.60 | 0.75–1.64 |
| Cover thickness | As for two component ball | |

The present invention provides a ball which can be produced more economically than a conventional golf ball. Golf balls for use in tournament and competitions usually consist essentially of a core comprising a core center of paste contained in a spherical rubber sac wound with rubber thread and/or rubber tape, and a cover compound of balata or the like moulded on to the core. Such balls have excellent durability, flight and playing characteristics but they are expensive to produce due to the lengthy procedure of manufacture. A cheaper ball is required for general playing purposes and for practice (e.g. on practice driving ranges) and hitherto such balls, in commercial use, have usually had essentially the same construction as the tournament ball but having a solid rubber center and having a cover made of a cheaper material (e.g. polychloroprene) than the tournament ball. These practice balls are durable but they are nevertheless still relatively expensive to produce.

The present invention provides a ball moulded from a polymer composition without a thread-wound core, which has good flight characteristics.

The balls of the present invention, especially where they are one-piece moulded balls of uniform density throughout, can with advantage have a surface pattern according to our copending United Kingdom application No. 13,924/67.

The invention is illustrated by the following Examples in which Examples 1 to 3 described the manufacture and testing of one-piece golf balls and Examples 4 and 5 describe the manufacture and testing of two-component golf balls.

EXAMPLE 1.

Twenty-seven and five tenths parts of a terpolymer of ethylene with a minor amount of butene-1 and less than 5 percent by weight of butadiene were mixed with 72.5 parts of cis-polybutadiene (cis-content 97 percent, ML-4 at 100° C. of 50) in an internal mixer at a temperature of 130° C. to 150° C. until a homogeneous blend resulted. Forty-eight parts of lead carbonate, three parts of titanium dioxide and one part of yellow pigment (for identification) were then added and mixing continued until a homogeneous blend again resulted. The mix was cooled to 120° C. and 3.25 parts of dicumyl peroxide were added.

The blend was then sheeted on a mill and the composition rapidly cooled to room temperature. The resulting sheet had a thickness of 0.120 inch.

Slabs 3 inches by 1 inch were cut from the sheet and were compression moulded and cured for 45 minutes in the mould at a temperature of 160° C. The cutting resistance of the cured slab was measured and compared with a conventional golf ball cover compound. Cutting resistance is given in arbitrary figures, a higher figure indicating a better resistance. The results are given in Table I.

A ball (diameter 1.62 inches) was then moulded from the composition and cured, and its resistance to cutting in play and its flight characteristics were determined and were compared with a conventional thread-wound range ball, as shown in Table I.

EXAMPLE II

Twenty-seven and five tenths parts by weight of a crystalline high density homopolymer of ethylene, melt flow index 0.9 g./10 min. (B.S. 2782 Method 105C) were mixed with 72.5 parts of cis-polybutadiene (as in Example I) in an internal mixer at a temperature of 160° C. to 180° C. until a homogeneous blend resulted. Forty-eight parts of lead carbonate, three parts of titanium dioxide and one part of yellow pigment were added and mixing continued until a homogeneous blend again resulted. The mix was cooled to 120° C. and 3.25 parts of dicumyl peroxide were added. Balls and slabs were moulded as in Example I and cured as previously described. The results of measurements and tests on the slabs and balls are given in Table I.

EXAMPLE III

The method of preparation used in this Example was the same as in Example II except that the thermoplastic polymer employed was a high density copolymer of ethylene and butene-1 (less than 5 percent by weight) having a melt flow index of 1.2 g./10 min. The results of tests on balls and slabs are given in Table I.

EXAMPLE IV

The composition of Example I was sheeted on a mill and extruded in a cold extruder to produce a rod 1.125 inches diameter. Spherical cores, 1.04 inches diameter, were moulded from plugs of the extrudate and cured for 7½ minutes at 150° C.

A cover composition was prepared as follows:

Forty-seven and five tenths parts of a copolymer of ethylene and methacrylic acid, containing 7 percent of the acid in which 85 percent of the acid was present as the sodium salt, and having a melt flow index at 190° C. of 0.5 g./10 min. were mixed with 52.5 parts of the cis-polybutadiene described in Example I, in an internal mixer at 150°—170° C. until a homogenous blend resulted. Forty-two parts of lead carbonate, 3.75 parts of titanium dioxide and 0.25 parts of a pigment were added and the mixing continued until a homogeneous blend again resulted. The mix was cooled, chipped in a granulator and 3.5 parts of dicumyl peroxide were added by tumble mixing. The blend was then compression moulded into a rough sheet at 100°—120° C. and rapidly cooled to room temperature. The resulting sheet had a nominal thickness of 0.125 inch.

Slabs 3 inches by 1 inch were cut from the sheet and were compression moulded to 0.120 inch thickness and cured for 45 minutes in the mould at a temperature of 160° C. The cutting resistance of the cured slab was measured and compared with a conventional golf ball cover compound. Cutting resistance is given in arbitrary figures, a higher figure indicating a better resistance. The results are given in Table I below.

Golf ball hemispherical half-shells having an internal diameter of 1.0 inch and wall thickness 0.310 inch were moulded from the above cover composition by heating at 100°—110° C. in a mould and cooling prior to extraction. The cores already prepared were coated with a 20 percent solution of triphenyl methane triisocyanate in methylene chloride and the solvent allowed to evaporate. Two half-shells were placed around a treated core and moulded in a dimpled mould at 160° C. for 45 minutes, followed by cooling prior to extraction, to produce a golf ball (D) 1.62 inches diameter of weight 45.1 grams. The golf ball was then compared with a conventional thread-wound range ball with regard to its resistance to cutting in play and its flight characteristics. The results are given in Table I.

EXAMPLE V

The composition of EXAMPLE II was sheeted on a mill and extruded as a rod 1.125 inches diameter in a cold extruder. Spherical cores 1.04 inches diameter were moulded from plugs of the extrudate for 7½ minutes at 150° C.

Slabs 3 inches by 1 inch and golf ball hemispherical cover half-shells were prepared and a golf ball (1.62 inches diameter) weight 45.7 grams moulded around the above cores using the same method as used in Example IV.

For purposes of comparison a conventional thread-wound ball (F) of diameter 1.62 inches was subjected to the same series of tests as the balls and slabs made by following the procedures of Examples I, II, III, IV and V (A, B, C, D and E respectively).

In Table I the headings to the various columns have the following meaning:

CR (b) = Cutting resistance of the ball.
CR (s) = Cutting resistance of a slab of the composition.
H = Hardness (Shore C).
Rebound = Percent rebound from a height of 100 inches on to a solid concrete base.
Resilience = Coefficient of restitution determined by firing a projectile at the ball and noting the time taken for ball and projectile to travel a predetermined distance.
CH = Compression Hardness "Click" is the sound made by contact between the golf club and the ball.

"Carry" represents the distance travelled by the ball from where it is struck to where it first lands on the ground.

"Total distance" represents the distance travelled by the ball from where it is struck to where it finally comes to rest on the ground and "Trajectory" is an arbitrary scale for comparing the heights to which balls rise during flight, a higher figure indicating a higher flight path.

The data are as follows:

TABLE I

| | CR (b) | CR (s) | H | Rebound | Resilience | CH | Click | Carry (yds.) | Total distance (yds.) | Trajectory |
|---|---|---|---|---|---|---|---|---|---|---|
| A | Good | 335 | 72 | 70 | 0.551 | 87 | Fairly good | 188 | 256 | 21¼ |
| B | Fairly good | 325 | 61 | 71 | 0.524 | 78 | do | 170 | 235 | 19¼ |
| C | do | 335 | 61 | 73 | 0.509 | 73 | do | 171 | 244 | 19½ |
| D | Very good | 340 | 70 | 66 | 0.560 | 82 | Good | 196 | 255 | 20½ |
| E | do | 340 | 70 | 66 | 0.563 | 80 | do | 197 | 267 | 21 |
| F | Good | 320 | 70 | 60 | 0.550 | 100 | do | 188 | 256 | 21½ |

It will be seen from the above that the play balls produced by the invention have similar properties in some respects to conventional range balls and in some respects are superior.

We claim:

1. A substantially spherical moulded solid golf ball of a composition providing the gravity, click, rebound and size required for a golf ball comprising a polymer blend consisting essentially of rubber and a thermoplastic substantially crystalline homopolymer of an alpha-mono olefin having from 1 to 6 carbon atoms or a copolymer of alpha-mono olefins having from 1 to 6 carbon atoms, the rubber being selected from the class consisting of polybutadiene, copolymers of butadiene with acrylonitrile, copolymers of butadiene with styrene, elastomeric copolymers of ethylene with an alpha-olefin higher than propylene, and polyisoprene and said rubber being present in the blend in an amount of from 50 percent to 90 percent by weight of the blend.

2. A golf ball according to claim 1, which is a one-piece moulded ball.

3. A golf ball according to claim 1, which consists of a core encased in a cover, the core consisting essentially of the blend of claim 1.

4. A golf ball according to claim 3, in which the core consists of a spherical inner core surrounded by a spherical shell, at least one of which consists essentially of the blend of claim 1.

5. A golf ball according to claim 4, in which the spherical inner core is selected from the group consisting of a glass ball and a steel ball and in which the spherical shell consists of at least two hollow semispherical shells consisting essentially of the blend of claim 1.

6. A golf ball according to claim 1, in which the rubber is present in an amount of from 60 percent to 80 percent by weight of the blend.

7. A golf ball according to claim 1, in which the rubber is a polybutadiene.

8. A golf ball according to claim 7, in which the rubber is a blend of cis-polybutadiene with natural rubber and/or one or more synthetic rubbers.

9. A golf ball according to claim 8, in which the cis-polybutadiene is present in an amount of at least 50 percent of the bland.

10. A golf ball according to claim 1, in which the alpha-mono olefin is ethylene.

11. A golf ball according to claim 1 wherein said blend is cured with an organic peroxide or sulfur or by irradiation.

12. A golf ball according to claim 11 wherein said blend is cured with an organic peroxide at a temperature of from 150° to 250° C.

13. A golf ball according to claim 12 wherein said organic peroxide is dicumyl peroxide.

14. A golf ball according to claim 1 wherein said crystalline homopolymer is selected from the group consisting of polyethylene, isotactic polypropylene, isotactic polybutene-1 and poly-4-methyl-pentene-1 and wherein said copolymer is a copolymer of the alpha-mono olefin of said crystalline homopolymer with a copolymerizable alpha-mono olefin selected from the group consisting of butene-1, hexene-1, ethylene and propylene provided that said copolymerizable alpha-mono olefin and said alpha-mono olefin of said crystalline homopolymer are different.

15. A golf ball according to claim 14 wherein said copolymer is a terpolymer of said copolymerizable alpha-mono olefin, said alpha-mono olefin of said crystalline homopolymer and butadiene wherein said butadiene is present in an amount less than 10 percent of the other monomers.

16. A substantially spherical moulded solid golf ball having the gravity, click, rebound and size required for a golf ball comprising a blend of polybutadiene and a thermoplastic substantially crystalline homopolymer of ethylene or a copolymer of a major amount of ethylene and a minor amount of another alpha-mono olefin having from 1 to 8 carbon atoms, said polybutadiene being present in an amount of from 50 percent to 90 percent by weight of said blend.